No. 862,096. PATENTED JULY 30, 1907.
J. A. McLANE.
PROCESS OF MAKING WIRE GLASS.
APPLICATION FILED MAR. 25, 1907.
3 SHEETS—SHEET 1.
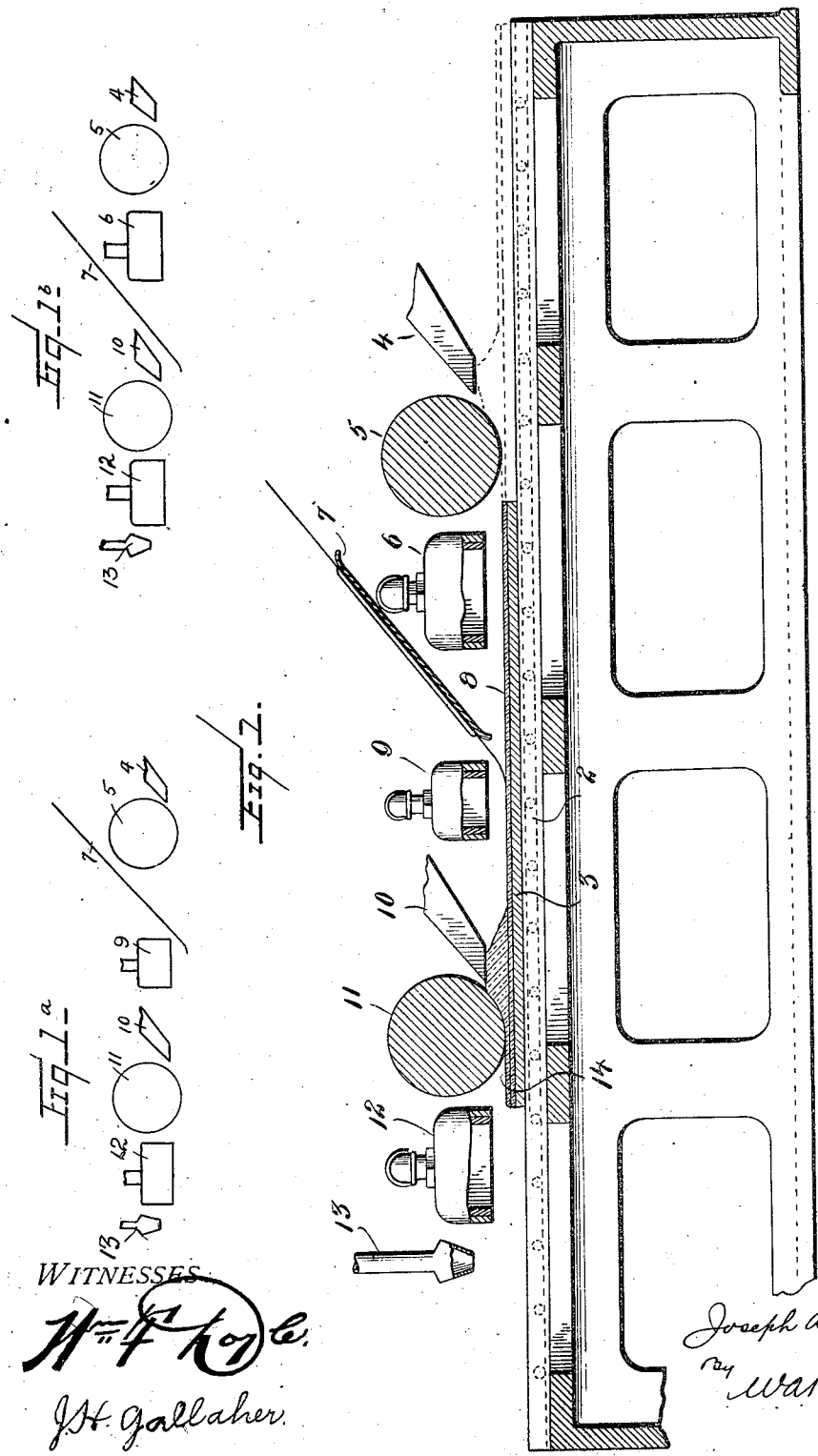
WITNESSES
INVENTOR
Joseph A. McLane,
By W. A. Edmond,
Attorney

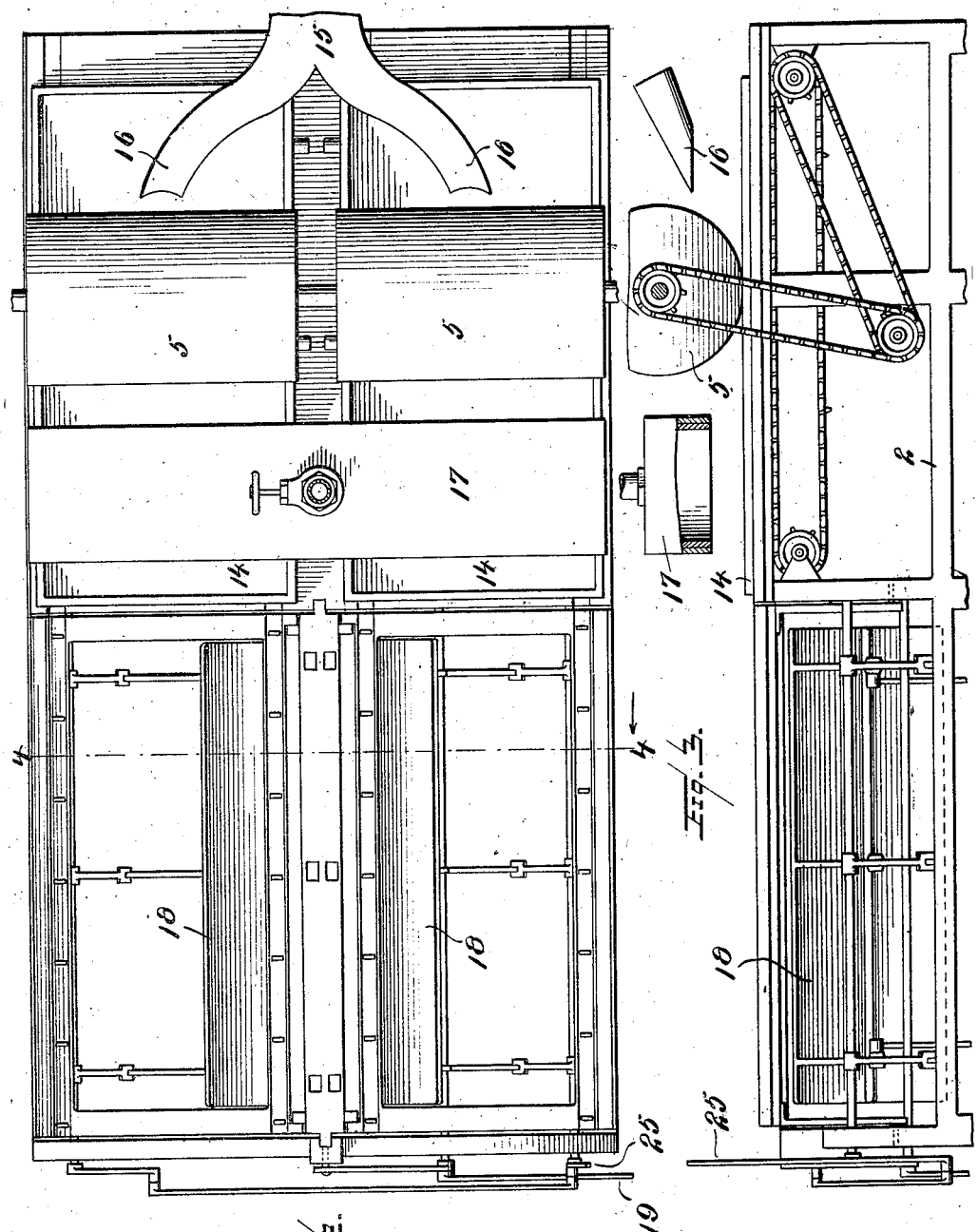

No. 862,096. PATENTED JULY 30, 1907.
J. A. McLANE.
PROCESS OF MAKING WIRE GLASS.
APPLICATION FILED MAR. 25, 1907.
3 SHEETS—SHEET 3
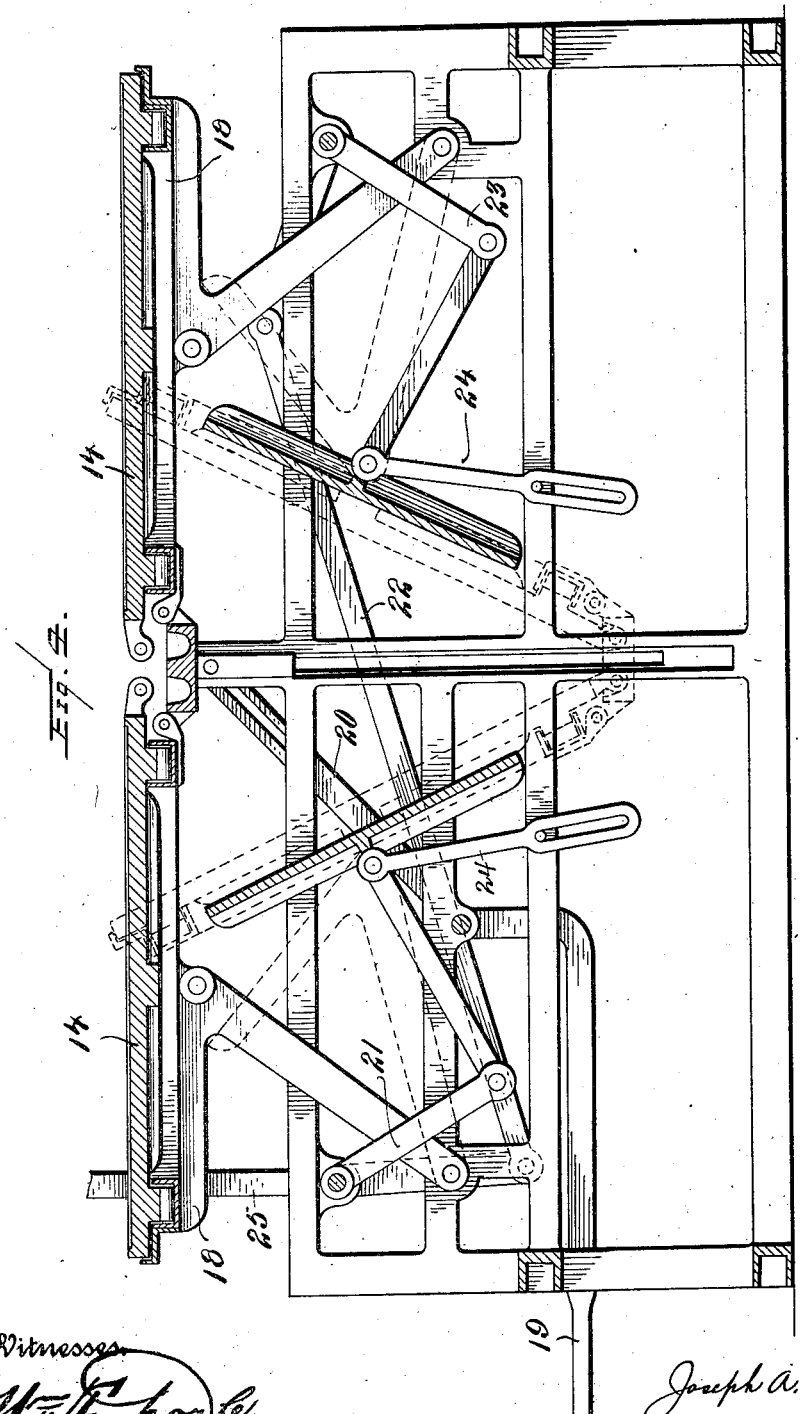
Witnesses
John H. Gallaher.
Inventor.
Joseph A. McLane,
By W. A. Redmond, Atty.

UNITED STATES PATENT OFFICE.

JOSEPH A. McLANE, OF GRAFTON, WEST VIRGINIA, ASSIGNOR OF ONE-HALF TO JOSEPH H. McDERMOTT, OF MORGANTOWN, WEST VIRGINIA.

PROCESS OF MAKING WIRE-GLASS.

No. 862,096.      Specification of Letters Patent.      Patented July 30, 1907.

Original application filed November 24, 1906, Serial No. 344,940. Divided and this application filed March 25, 1907. Serial No. 364,395.

*To all whom it may concern:*

Be it known that I, JOSEPH A. MCLANE, a citizen of the United States, residing at Grafton, in the county of Taylor and State of West Virginia, have invented a certain new and useful Improvement in Processes of Making Wire-Glass, of which the following is a specification.

My invention relates to the manufacture of wire glass, its object being to insure the perfect welding together of the two sheets of glass around the interposed wire netting to form the finished plate, and also to produce a clearer finished product freer from the imperfections found in wire glass as now manufactured.

In the most approved manufacture of wire glass now in practical use one sheet is rolled, the wire is applied to that sheet and the other sheet quickly rolled over the wire. The contact of the roll or rolls in so spreading the glass into sheet form leaves imprinted on the sheet or sheets the imperfections of the pressing roll or rolls and forms a chill skin on the surface of each sheet, which immediately sets and tends to blur or deaden the natural transparency of the glass plate, and interfere to some extent with the passage of light through the same. Another difficulty in the manufacture of wire glass is that on account of the difference in cooling action of one or both layers, and the difference in the co-efficient of expansion of the wire and the glass, strains are liable to be created within the finished plate, which are liable to lead to breakage. A further difficulty is that the wire as placed between the layers of glass is liable to carry small particles of air with it which are inclosed between the two sheets and leave bubbles or imperfections in the body of the glass. It is believed that by the present invention these difficulties are overcome and a better and clearer quality of wire glass produced.

To these ends the invention consists, generally stated, in rolling one sheet or layer of glass, remelting the exposed surface and applying wire netting thereto and uniting said sheet with another sheet to produce a finished plate of wire glass.

It also consists in rolling the one layer, remelting the exposed surface thereof and applying another layer without the insertion of the wire netting, as well as in other improvements as herein set forth.

The invention may be practiced in different ways, the preferred method being, however, to roll a single sheet of glass, remelt the surface thereof and apply the wire netting to the same and to roll another sheet of glass upon the remelted surface of the first sheet, so forming the complete plate of wire glass, as hereafter described.

In the accompanying drawings Figure 1 is a side view partly broken away illustrating apparatus suitable for practicing the invention in the preferred way; Figs. 1ª and 1ᵇ are diagrammatic views of modified arrangements and Figs. 2, 3 and 4 illustrate the apparatus suitable for the practice of the invention where two sheets are simultaneously rolled, the wire interposed and the sheets pressed together, Fig. 2 being a plan view, Fig. 3 a side elevation, and Fig. 4 a vertical section on the line 4—4, Fig. 2, looking in the direction of the arrow.

I will first describe the preferred method of rolling as illustrated in Fig. 1, in which I employ a suitable casting table 2, supporting a suitable platen 3, which in the preferred form slides or travels upon the table. Above the said table is the feeding spout 4 and the roller 5 for rolling the first layer or sheet of glass. Back of the same is the burner 6, used for remelting the surface of the sheet, and back of the said burner is the feeding incline 7 down which the wire netting is fed upon the sheet 8 which is produced by the roller 5. Back of the said feeding incline is the burner 9 which is used for the purpose of further reheating the surface of the sheet and heating the wire netting laid upon the same, so as to bring the wire netting up to approximately the heat of the glass before the second layer of glass is cast and rolled upon the same. The spout 10 provides for the feeding of the glass for the second layer in front of the roll 11, this roll being adjusted to roll a layer of the desired thickness upon the first layer 8, being generally adjusted so that its surface travels twice the height above the table of the roll 5. A burner 12 is preferably located back of the roll 11 for reheating the surface of the finished plate, and back of said burner is suspended an air pipe 13 adapted to play upon the surface of the sheet after it has been remelted by the burner 12 to aid in setting or cooling the same.

In the practice of the invention with the above apparatus, the first sheet or layer of glass 8 is cast upon the table in the ordinary manner of casting and rolling plates or sheets of glass. In so doing as the surface of the roller cannot be maintained of absolute perfect smoothness, there are of course some irregularities imprinted on the surface of the sheet from contact with the roller which contact also serves to chill the surface and forms a chill skin or mat glaze thereon as above referred to. As the sheet is carried along on the table to pass under the burner 6, which by projecting or reflecting the heat down upon the surface of the sheet remelts the same, raising that surface again up to practically a good melting heat, and so both melting off or removing the mat glaze and thereby smoothing out and obliterating the irregularities formed by the roller, and also raising the surface of the sheet to such melting heat so that when the second sheet is rolled thereon the molten glass from which said sheet is rolled will quickly unite with the remelted surface of the first sheet, forming a practically clear sheet of glass, free from the blurs or imperfections formed on the surface of the first sheet in the rolling thereof. I prefer to provide this reheating burner directly back of the first roll 5 and then to feed the wire on the surface of the reheated sheet, and I also prefer to employ a second burner, such as the burner 9, after the feeding of the wire to the sheet, to directly heat the wire and to drive away any air bubbles around the mesh of the wire, as both surfaces of the wire, before the casting of the second layer of glass, are heated, one by contact with the surface of the first layer rolled and the other by the heat of the burner blowing upon the wire. The first sheet of glass so rolled is then fed under the spout 10, which deposits or casts the glass for the second sheet upon the surface of the first sheet, and by means of the roller 11 the second or top layer or sheet 14 is rolled upon the first layer 8 and because of the highly heated and remelted surface of the first layer, perfect union of the second pour of molten glass and the layer formed therefrom with the first sheet is obtained, while the reheating of the exposed surface of the first layer as above stated removes the chill skin and drives away any air bubbles adhering to the wire, and the wire mesh itself is allowed to expand being brought closer to the heat of the glass before the second layer is cast thereon, and the two layers are united with less fear of injury from uneven expansion of the glass forming the two layers and of the wire between the same. Thus the heat radiated down upon the surface of the first layer reheats the same and brings the surface of the first sheet up to such high temperature that a positive melting union or weld between the two sheets is assured.

In order to overcome the necessity of grinding the one face of the sheet so formed, or to reduce the cost of grinding or finishing the same, I also prefer to carry the finished plate of wire glass under another reheating burner 12, which serves to remelt the surface of the plate after it has passed under the second roller to remove therefrom the chill skin or mat glaze formed on the same, and to allow the glazed surface when in practically molten condition to assume a practically smooth level surface, eliminating the imperfections caused by the rolling of the top surface of the plate. The reheated surface can then be carried under an air pipe, such as the pipe 13, and the surface of the glass as so reheated and respread and smoothed out by the heat from the burner 12 can be set. In this way the grinding of the upper surface of the plate in order to produce a transparent plate of wire glass is obviated or reduced materially, and the cost of production of the transparent sheet of wire glass decreased.

While I prefer the above operation it is evident that the wire netting may be introduced before the melting of the surface of the glass. For example, as shown in Fig. 1ᵃ the burner 6 may be omitted and a burner in the position of the burner 9 may be utilized both for remelting the surface of the glass and at the same time for heating the wire. The invention can also be employed without the use of the burner 9, in which case the burner 6 will be utilized to remelt the surface of the glass, and the wire may be applied to such remelted surface without applying a second remelting heat to the wire and the surface of the sheet. The latter modification is shown in Fig. 1ᵇ but is not, however, considered as desirable as either of the former. It is also evident that the invention may be practiced with a single roll made adjustable by any preferred means (not shown) to two different heights, such for example as where the roll 5 is omitted, the first sheet may be rolled out by the roll 11, and the platen then carried back under that roll which has been raised to proper position for forming the second sheet, and the surface of this sheet may be remelted as it is again fed toward the roll 11 for the rolling of the second sheet. These modifications as illustrated in the above form of apparatus are all of them within the scope of the invention.

The invention may also be practiced by the simultaneous rolling of two sheets, the remelting of the surface of both these sheets, the application of the wire to one sheet, and the forcing of the two sheets into contact, as more clearly illustrated in connection with Figs. 2, 3 and 4. This specific method forms the subject matter of an application filed by me November 24, 1906, Serial No. 344,940, of which this application is a division, the present application forming the generic case while the former application is specific thereto. In the said apparatus I employ the traveling platens 14 to which the glass is delivered simultaneously by the spout 15 with two branches 16, the glass sheets being then carried under the burners 17 and the platens fed over onto the folding tables 18, the wire being applied to the surface of one of the sheets upon said table and then by the mechanism illustrated the two platens being lowered by means of the hand or foot lever 19 and slotted levers 20 controlling such movement, and being forced into contact by means of the levers 21, 22 and 23, and links 24, and hand lever 25, so that the two surfaces of the sheets as so remelted with the wire in between are forced into intimate contact and so united.

In the above description by the term "remelting the surface of the sheet" I mean applying a sufficient heat to again raise the surface up to a melting heat by which the irregularities or imperfections caused by the contact of the roll with the molten glass are melted down, and the remelted surface allowed to assume a practically level or smooth surface and the chilled skin removed, so eliminating the imperfections caused by rolling the top surface of the plate, and the surface of the sheet is brought back to such melting heat as will cause it to readily unite with the glass of the sheet either cast or pressed thereon. In this way I am enabled to produce a practically clear sheet of glass, free from the blurs or imperfections formed by the rolling of the sheet or sheets, and to drive away the air bubbles from the wire so as to practically remove the difficulty of the inclosing of such air bubbles within the body of the glass sheet, and by the proper manipulation of the heat from the burners to hold the glass at such proper melting temperature as will cause the union of the two sheets of glass properly but largely free from strain. I am also enabled after the forming of the sheet to remelt the surface of the finished plate of wire glass and again to chill that surface quickly and in that way to overcome the necessity for grinding of the one surface of the plate, and thereby to reduce the cost of producing a clear wire glass.

What I claim is:

1. The process of making wire glass, consisting in rolling one sheet or layer of glass, remelting the exposed surface and applying a wire netting thereto, and uniting said sheet with another sheet to produce a finished plate of wire glass.

2. The process of making wire glass, consisting in rolling a sheet or layer of glass, remelting the exposed surface thereof, applying a wire netting thereto, and simultaneously applying heat to the wire and the exposed surface of the sheet, and applying another sheet onto the first sheet.

3. The process of making wire glass, consisting in rolling a sheet or layer of glass, applying a wire netting thereto, remelting the exposed surface of the glass layer and heating the wire netting thereon, and applying another sheet to the first sheet.

4. The process of making glass, which consists in rolling one sheet or layer of glass, remelting the exposed surface thereof, and uniting said sheet with another sheet to produce the finished plate of glass, and then remelting the exposed top surface of the finished plate.

5. The process of making wire glass, consisting in rolling one sheet or layer of glass, remelting the exposed surface thereof and applying a wire netting thereto, and rolling another sheet or layer of glass upon the remelted surface of the first sheet.

6. The process of making wire glass, consisting in rolling one sheet or layer of glass, remelting the exposed surface thereof, applying a wire netting thereto and simultaneously applying heat to the wire and the exposed surface of the sheet, and rolling another sheet or layer of glass upon the melted surface of the first sheet.

7. The process of making wire glass, consisting in rolling one sheet or layer of glass, remelting the surface thereof, applying a wire netting thereto, and rolling another sheet or layer of glass upon the remelted surface of the first sheet.

8. The process of making wire glass, consisting in rolling one sheet or layer of glass, remelting the exposed surface thereof, and applying a wire netting thereto, and rolling another sheet or layer of glass upon the remelted surface of the first sheet, and then remelting the exposed top surface of the finished sheet.

9. The process of making glass, which consists in rolling one sheet or layer of glass, remelting the exposed surface thereof, and uniting said sheet with another sheet to produce the finished plate of glass.

In testimony whereof, I affix my signature, in the presence of two witnesses.

JOSEPH A. McLANE.

Witnesses:
F. P. BROWN,
WM. ARCHDEACON.